(12) United States Patent
Todd et al.

(10) Patent No.: US 10,472,557 B2
(45) Date of Patent: Nov. 12, 2019

(54) PROCESS FOR INHIBITION OF SULPHIDE SCALES

(71) Applicant: Clariant International Ltd., Muttenz (CH)

(72) Inventors: Malcolm Todd, Aberdeen (GB); Catherine Strachan, Aberdeenshire (GB); Gordon Moir, Aberdeenshire (GB); John Goulding, East Yorkshire (GB)

(73) Assignee: Clariant International Ltd, Muttenz (CH)

( * ) Notice: Subject to any disclaimer, the term of this patent is extended or adjusted under 35 U.S.C. 154(b) by 0 days.

(21) Appl. No.: 15/634,954

(22) Filed: Jun. 27, 2017

(65) Prior Publication Data

US 2017/0292058 A1    Oct. 12, 2017

Related U.S. Application Data

(62) Division of application No. 14/394,016, filed as application No. PCT/EP2013/000934 on Mar. 26, 2013.

(30) Foreign Application Priority Data

Apr. 13, 2012    (EP) .................................... 12002636

(51) Int. Cl.
| | | |
|---|---|---|
| C09K 8/532 | (2006.01) | |
| C02F 5/12 | (2006.01) | |
| C08F 30/02 | (2006.01) | |
| C08F 220/58 | (2006.01) | |
| C02F 1/66 | (2006.01) | |
| C02F 5/14 | (2006.01) | |
| C02F 101/10 | (2006.01) | |
| C02F 103/10 | (2006.01) | |

(52) U.S. Cl.
CPC ................ C09K 8/532 (2013.01); C02F 5/12 (2013.01); C08F 30/02 (2013.01); C08F 220/58 (2013.01); C02F 1/66 (2013.01); C02F 5/14 (2013.01); C02F 2101/101 (2013.01); C02F 2103/10 (2013.01); C08F 2220/585 (2013.01)

(58) Field of Classification Search
CPC ... C08F 220/58; C08F 2220/585; C09K 8/532
See application file for complete search history.

(56) References Cited

U.S. PATENT DOCUMENTS

| | | | |
|---|---|---|---|
| 4,762,626 | A | 8/1988 | Emmons |
| 5,171,459 | A | 12/1992 | Kaplan |
| 7,150,319 | B2 | 12/2006 | Heier |
| 2004/0244975 | A1 | 12/2004 | Heier |
| 2005/0067164 | A1 | 3/2005 | Ke |
| 2007/0010404 | A1 | 1/2007 | Welton |
| 2007/0039732 | A1 | 2/2007 | Dawson |
| 2007/0125987 | A1* | 6/2007 | Hills .......................... C02F 5/12 252/408.1 |
| 2007/0282086 | A1 | 12/2007 | Woodward et al. |
| 2008/0035339 | A1* | 2/2008 | Welton ................... C09K 8/524 166/279 |

(Continued)

FOREIGN PATENT DOCUMENTS

| | | |
|---|---|---|
| CN | 102066389 A | 5/2011 |
| DE | 10 2008 063096 | 7/2010 |
| EP | 0643081 A | 3/1995 |

OTHER PUBLICATIONS

International Search Report for PCT/EP2013/000934, dated Jun. 25, 2013.

(Continued)

*Primary Examiner* — Alicia Bland
(74) *Attorney, Agent, or Firm* — Tod A. Waldrop

(57) ABSTRACT

The invention provides for the use of a copolymer, comprising
a) 0.1 to 10 mol-%, based on the weight of the copolymer, of structural units derived from vinylphosphonic acid or of a salt thereof,
b) 40 to 80 mol-%, based on the weight of the copolymer, of structural units derived from compounds of the formula (1)

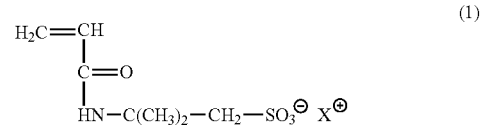

c) 1 to 50 mol-%, based on the weight of the copolymer, of structural units derived from compounds of the formula (5)

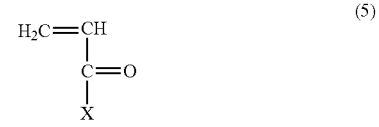

in which X is OH or $NR^3R^4$, and $R^3$ and $R^4$, independently of one another, are H or $C_1$-$C_4$-alkyl,
for the inhibition and/or dispersion of inorganic sulphide scales, and for a process for the inhibition and/or dispersion of inorganic sulphide scales, the process comprising adding to water being within an oil or gas containing formation said copolymer.

15 Claims, No Drawings

(56) References Cited

U.S. PATENT DOCUMENTS

| | | | |
|---|---|---|---|
| 2009/0143252 A1* | 6/2009 | Lehmann | C09K 8/532 507/90 |
| 2009/0163389 A1 | 6/2009 | De Campo | |
| 2011/0195873 A1 | 8/2011 | Heath et al. | |
| 2011/0263465 A1 | 10/2011 | Kayser | |
| 2013/0023449 A1 | 1/2013 | Heath | |
| 2014/0336089 A1 | 11/2014 | Heath | |

OTHER PUBLICATIONS

International Preliminary Report on Patentability for PCT/EP2013/000934, dated Oct. 14, 2014.
Machine Translation of the Specification of EP0643081, dated Mar. 15, 1995.
Machine Translation of the Claims of EP0643081, dated Mar. 15, 1995.

* cited by examiner

PROCESS FOR INHIBITION OF SULPHIDE SCALES

FIELD OF THE INVENTION

The invention relates to a process for the inhibition and/or dispersion of inorganic sulphide scales by use of synthetic copolymers. The copolymers of the invention have particular applicability in inhibiting and/or dispersing zinc sulphide, lead sulphide and iron sulphide.

BACKGROUND

Water from natural sources often contains dissolved minerals, with an appreciable presence of ions such as $Ca^{2+}$, $Mg^{2+}$ and, in the case of oilfield formation water, $Ba^{2+}$, $Sr^{2+}$, $Zn^{2+}$, $Pb^{2+}$ and $Fe^{2+}$. Under conditions of temperature or pH change, loss of carbon dioxide from solution or admixture with other water containing different mineral content, relatively insoluble species such as carbonates, sulphates and sulphides may deposit from solution as scale. In offshore oilfields such deposition may be particularly acute when sulphate-containing seawater, pumped underground to aid oil recovery, comes into contact with formation water.

Further to this if a formation water contains sulphide ions, as a result of, but not limited to the presence of hydrogen sulphide ($H_2S$) gas in the reservoir, zinc sulphide (ZnS), lead sulphide (PbS) and iron sulphide (FeS, $FeS_2$) scales can form as a result of zinc, lead or iron containing brines mixing together.

Deposited scale impedes oil recovery and may even become severe enough to block an oil well. It is therefore a common procedure to treat oil wells with a scale inhibitor to minimise or prevent scale deposition. A careful balance of properties must be achieved. The scale inhibitor must not only control scale, but must also on the one hand have sufficient solubility in the waters at the temperatures it will meet to enable placement in the well.

Exotic scales such as zinc sulphide, lead sulphide and iron sulphide can be removed using an acid treatment to restore the rate of oil recovery. However new sulphide scales will be deposited in the well in a short space of time resulting in re-treatment. Acid treatment of exotic scale poses a severe risk due to the generation of $H_2S$ gas within the well.

PRIOR ART

U.S. Pat. No. 4,762,626 discloses the use of a hydroxethylacrylate/acrylic acid copolymer as a zinc sulphide scale inhibitor in oil well production processes. The copolymers have an average molecular weight within a range of 1,000 to 20,000 Da. Wells can typically be treated with between 2 and 100 ppm of the copolymer on an active basis.

U.S. Pat. No. 5,171,459 discloses the use of a scale inhibitor comprising of a phosphate ester or phosphonate, for $CaCO_3$ inhibition combined with a alkyldiphenylether sulphonate for dispersing sulphide scales/deposits. The sulphide dispersant comprises mono- and/or disulphonated alkyldiphenylether, wherein the alkyl substituent has from 4 to 30 carbon atoms and can be branched or linear. The dispersant and inhibitor are treated with between 1 and 50 ppm each and can treat a water with the zinc and/or lead concentration up to around 200 ppm.

US 2005/0067164 A1 discloses copolymer derived from a cationic monomer that inhibits and controls zinc sulphide and iron sulphide scales formed when zinc bromide brines are used as completion fluids. The copolymer in the invention contains an acrylamide unit and a diallyldimethylammonium salt thereof. The copolymers have an average molecular weight within a range of 500,000 and 5,000,000 Da. The copolymers of the invention may also be used to treat scales of calcium, barium, magnesium etc, such as barium sulphate, calcium sulphate and calcium carbonate. When treating oil wells, the copolymer as part of a carrier fluid is present in amounts between 15 and 100,000 ppm. When present in brine, the copolymer is typically between 0.02 and 2 mol-%.

US 2009/0143252 A1 discloses a monomer with a general formula (as specified within the patent) that is part of a homopolymer, where a part of the monomer ("A" within the general formula) can be a straight or branched alkyl chain ranging from 1 to 10 carbon atoms, or is a copolymer of monomers such as acrylate, acrylamide or methacrylamide to disperse metal sulphides prior to their forming scales. Terpolymers of dimethyldiallylammonium salt, 2-hydroxypropyl acrylate and acrylic acid could also be used for this purpose. The homopolymers and copolymers in the invention have an average molecular weight within a range of 5000 and 5,000,000 Da. The method of treating is described in the invention as being introduced into crude oil at a concentration of between 1 and 10,000 ppm.

The object of the invention was to provide copolymers which can be used for the inhibition and/or dispersion of inorganic sulphide scales. The copolymers of the invention should have particular applicability in inhibiting and/or dispersing zinc sulphide, lead sulphide and iron sulphide. They should be notable for improved biodegradability compared to the copolymers of the prior art.

It has now been found that copolymers comprising of sulphonic acid acrylic units, acrylamide units and phosphoric acid units and, optionally, cyclic amide units perform in the desired manner.

The invention therefore provides for the use of a copolymer, comprising
a) 0.1 to 10 mol-%, based on the weight of the copolymer, of structural units derived from vinylphosphonic acid or of a salt thereof,
b) 40 to 80 mol-%, based on the weight of the copolymer, of structural units derived from compounds of the formula (1)

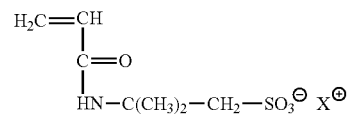

c) 1 to 50 mol-%, based on the weight of the copolymer, of structural units derived from compounds of the formula (5)

in which X is OH or $NR^3R^4$, and $R^3$ and $R^4$, independently of one another, are H or $C_1$-$C_4$-alkyl,
for the inhibition and/or dispersion of inorganic sulphide scales.

In another aspect, the invention provides for a process for the inhibition and/or dispersion of inorganic sulphide scales, the process comprising adding to water being within an oil or gas containing formation a copolymer comprising a) 0.1 to 10 mol-% of structural units derived from vinylphosphonic acid or of a salt thereof, b) 40 to 80 mol-% of structural units derived from compounds of the formula (1)

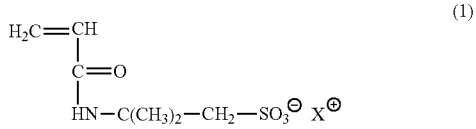

c) 1 to 50 mol-% of structural units derived from compounds of the formula (5)

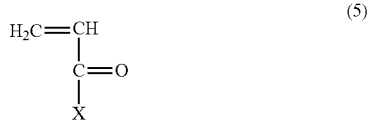

in which X is OH or $NR^3R^4$, and $R^3$ and $R^4$, independently of one another, are H or $C_1$-$C_4$-alkyl.

In one preferred embodiment, the use and the process are conducted with a copolymer comprising additionally 1 to 10 mol-%, based on the weight of the copolymer, of structural units of formula (2)

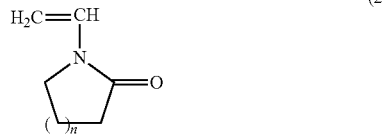

in which n is 3, 4 or 5.

In another preferred embodiment, the use and the process are conducted with a copolymer comprising additionally 1 to 10 mol-% of structural units of formula (3)

in which $R^1$ and $R^2$, independently of one another, are hydrogen or $C_1$-$C_4$-alkyl.

In all embodiments of the invention, monomers comprising an olefinically unsaturated hydrocarbon substituted ammonium salt group, wherein the expression hydrocarbon encompasses groups containing oxygen, are present in the copolymer in an amount of preferably below 1 mol-%, particularly 0.001 to 1 mol-%, especially 0.001 to 0.1 mol-%. They are particularly preferably completely absent.

In all embodiments of the invention, the proportion by weight of vinylphosphonic acid or salts thereof is preferably from 0.8 to 6, especially from 1 to 4 mol-%. Suitable salts of vinylphosphonic acid are preferably the alkali metal or ammonium ($NH_4^+$) salts thereof.

In a preferred embodiment, the proportion of structural units which are derived from compounds of the formula (1) in all embodiments of the invention is preferably from 45 to 70, especially from 50 to 65 mol-%.

The proportion of structural units which are derived from compounds of the formula (5) is preferably from 5 to 45, especially from 10 to 40 mol-%. Formula (5) preferably represents acrylic acid and/or acrylamide. If formula (5) represents only acrylamide, the proportion thereof is preferably from 5 to 45, especially from 10 to 40 mol-%. If formula (5) represents a mixture of acrylic acid and acrylamide, the proportion of acrylic acid is preferably from 1 to 10 mol-%, especially from 2 to 5 mol-%, and the proportion of acrylamide provides for the difference up to the total molar amount as described above.

The proportion of structural units which are derived from compounds of the formula (3) is preferably from 1 to 10, particularly from 2 to 8, especially from 3 to 7 mol-%.

The proportion of structural units which are derived from compounds of the formula (2) is preferably from 1 to 10, particularly from 2 to 8, especially from 3 to 7 mol-%.

Particular examples of suitable copolymers comprise (molar %).

58% AMPS, 38% Acrylic Amide, 2% n-Vinyl Formamide, 2% Vinyl Phosphonic Acid.

78% AMPS, 38% Acrylic Amide, 2% n-Vinyl Formamide, 2% Vinyl Phosphonic Acid.

83% AMPS, 5% n-Vinyl Pyrrolidone, 5% n-Vinyl Formamide, 5% Acrylic Amide, 2% Vinyl Phosphonic Acid.

The monomer units may be in any sequence in the copolymers. They may be either random polymers or block polymers.

The molecular weights (number average) of the copolymers according to the invention are preferably from 100,000 to 10,000,000 g/mol, in particular from 500,000 to 5,000,000 g/mol. Molecular weight is to be determined by GPC against polyacrylic acid as standard.

The relative viscosity and the k value of the copolymer may also serve as indicator for the molecular weight. To determine the k value, the copolymer is dissolved in a certain concentration (generally 0.5%) and the efflux time at 25° C. is determined by means of an Ubbelohde capillary viscometer. This value gives the absolute viscosity of the solution ($\eta_c$). The absolute viscosity of the solvent is $\eta_0$. The ratio of the two absolute viscosities gives the relative viscosity $$z = \frac{\eta_0}{\eta_0}$$

From the relative viscosities, the k value can be determined as a function of the concentration by means of the following equation:

$$Lgz = \left( \frac{75 \cdot k^2}{1 + 1.5\,kc} + k \right) c$$

The copolymers according to the invention can be prepared by copolymerization of compounds of the formulae (1), (2) and (3), (5) and vinyl phosphonic acid, in the stated molar ratios.

The copolymers according to the invention can be prepared by the conventional polymerization methods, such as solution polymerization, mass polymerization, emulsion polymerization, inverse emulsion polymerization, precipitation polymerization or gel polymerization. They are preferably the product of a free-radical copolymerization of the compounds of the formulae (1), (2) and (3), (5) and vinyl phosphonic acid.

The polymerization is preferably carried out as solution polymerization in water and as precipitation polymerization.

On carrying out the copolymerization in a water-miscible organic solvent, the conditions of precipitation polymerization are employed. Here, the copolymer is obtained directly in solid form and can be isolated by distilling off the solvent or filtering with suction and drying.

Water-miscible organic solvents which are suitable here are in particular water-soluble alkanols, i.e. those having 1 to 4 carbon atoms, such as methanol, ethanol, propanol, isopropanol, n-butanol, sec-butanol and isobutanol, but preferably tert-butanol.

The water content of the lower alkanols used here as solvent should not exceed 6 mol-%, since otherwise agglomeration may occur during the polymerization. Preferably, a water content of 0 to 3 mol-% is employed.

The amount of the solvent to be used depends to a certain degree on the type of comonomers used. As a rule, from 200 to 1000 g of the solvent are used per 100 g of total monomers.

When carrying out the polymerization in an inverse emulsion, the aqueous monomer solution is emulsified in a known manner in a water-immiscible organic solvent, such as cyclohexane, toluene, xylene, heptane or high-boiling gasoline fractions, with the addition of from 0.5 to 8 mol-%, preferably from 1 to 4 mol-%, of known emulsifiers of the w/o type and polymerized with conventional free radical initiators. In this process, water-soluble monomers or mixtures thereof are polymerized at elevated temperatures to give high molecular weight copolymers by first emulsifying the monomers or the aqueous solutions thereof, with the addition of water-in-oil emulsifiers, in water-immiscible organic solvent forming the continuous phase, and heating this emulsion in the presence of free radical initiators. The comonomers to be used may be emulsified as such in the water-immiscible organic solvent or they may be used in the form of an aqueous solution which contains from 100 to 5 mol-% of comonomers and from 0 to 95 mol-% of water, the composition of the aqueous solution depending on the solubility of the comonomers in water and on the intended polymerization temperature. The weight ratio of water to the monomer phase can be varied within wide limits and is as a rule from 70:30 to 30:70.

To emulsify the monomer phase in the water-immiscible organic solvent to give a water-in-oil emulsion, from 0.1 to 10 mol-%, based on the oil phase, of a water-in-oil emulsifier are added to the mixtures. Preferably used emulsifiers are those which have a relatively low HLB value. The oil phase used can in principle be any inert water-insoluble liquid, i.e. in principle any hydrophobic organic solvent. In general, hydrocarbons whose boiling point is in the range from 120 to 350° C. are used. These hydrocarbons may be saturated, linear or branched paraffin hydrocarbons, as are predominantly present in petroleum fractions, it also being possible for these to comprise the usual proportions of naphthene hydrocarbons. However, aromatic hydrocarbons, such as, for example, toluene or xylene, and mixtures of the abovementioned hydrocarbons may also be used as the oil phase. A mixture of saturated normal paraffin and isoparaffin hydrocarbon which comprises up to 20 mol-% of naphthenes is preferably used.

Copolymers having a particularly high degree of polymerization in the base chains are obtained as polymerization is carried out in aqueous solution by the so-called gel polymerization method. From 15 to 60% strength aqueous solutions of the comonomers are obtained with known suitable catalysts without mechanical mixing, with utilization of the Trommsdorff-Norrisch effect.

By subsequently heating the polymer gels, obtained in the gel polymerization, in the temperature range from 50 to 130° C., preferably from 70 to 100° C., the quality properties of the polymers can be further improved.

The copolymers prepared by this method and present in the form of aqueous gels can be dissolved directly in water after mechanical comminution using suitable apparatuses and can be used. However, they can also be obtained in solid form after removal of the water by known drying processes and not dissolved again in water until they are used.

The polymerization reaction is carried out in the temperature range from −60° C. to 200° C., preferably from 10 to 120° C., it being possible to employ either atmospheric pressure or superatmospheric pressure. As a rule, the polymerization is carried out in an inert gas atmosphere, preferably under nitrogen.

High-energy electromagnetic or corpuscular radiation or conventional chemical polymerization initiators can be used for initiating the polymerization, for example organic peroxides, such as benzyl peroxide, tert-butyl hydroperoxide, methyl ethyl ketone peroxide or cumyl hydroperoxide, azo compounds, such as azobisisobutyronitrile or 2'-azobis(2-amidopropane) dihydrochloride, and inorganic peroxy compounds, such as $(NH_4)_2S_2O_8$ or $K_2S_2O_8$ or $H_2O_2$, if required in combination with reducing agents, such as sodium bisulfite and iron(II) sulfate, or redox systems which comprise an aliphatic or aromatic sulfinic acid, such as benzenesulfinic acid or toluenesulfinic acid or derivatives of these acids, such as, for example, Mannich adducts or sulfinic acid, aldehydes and amino compounds, as a reducing component. As a rule, from 0.03 to 2 g of the polymerization initiator are used per 100 g of total monomers.

It is furthermore known that small amounts of so-called moderators may be added to the polymerization batches, said moderators harmonizing the course of the reaction by flattening the reaction rate/time diagram. They thus lead to an improvement in the reproducibility of the reaction and therefore make it possible to prepare uniform products having extremely small quality deviations. Examples of suitable moderators of this type are nitrilotrispropionylamide, monoalkylamines, dialkylamines or trialkylamines, such as, for example, dibutylamine. Such moderators can advantageously also be used in the preparation of the copolymers according to the invention.

Furthermore, so-called regulators, i.e. those compounds which influence the molecular weight of the polymers prepared, can be added to the polymerization batches. Known regulators which may be used are, for example, alcohols, such as methanol, ethanol, propanol, isopropanol, n-butanol, sec-butanol and amyl alcohols, alkyl mercaptans, such as, for example, dodecyl mercaptan and tart-dodecyl mercaptan, isooctyl thioglycolate and some halogen compounds, such as, for example, carbon tetrachloride, chloroform and methylene chloride.

The copolymers according to the invention are outstandingly suitable in the inhibition and/or dispersion of inorganic sulphide scales, particularly in inhibiting and/or dispersing zinc sulphide, lead sulphide and iron sulphide scales. Their biodegradability is considerably superior to that of the copolymers of the prior art.

The copolymers of the invention effectively inhibit and/or disperse by way of controlling the aggregation of inorganic scale formations within hydrocolloids, such as the formation water brines in oil wells and reservoirs. The copolymers of the invention show particular applicability in the inhibition and/or dispersion of zinc sulphide, lead sulphide and iron sulphide scales.

The copolymers of the invention can prevent the aggregation of inorganic sulphide scales through either continuous injection into an oil well as a neat chemical, or as part of a carrier fluid such as brine. The amount of the copolymer required will depend upon how severe the sulphide scale in an oil well or reservoir is.

In general, the copolymers according to the invention are preferably used in concentrations of 1 to 10,000 ppm, in particular from 10 to 1000 ppm by weight based on the weight of the aqueous system susceptible to scale formation.

The copolymers of the invention can additionally be blended with scale inhibitors that are used for more conventional scales, such as, but not limited to, calcium carbonate and barium sulphate. The performance of the copolymers of the invention as sulphide scale inhibitors are not lessened by the presence of conventional scale inhibitors and neither is the performance of the conventional scale inhibitors lessened by the presence of the copolymers of the invention as sulphide scale inhibitors.

Suitable conventional scale inhibitors include diethylenetriamine penta(methylene phosphonic acid), or nitrilo(methylene phosphonic acid) although any phosphonate scale inhibitor can be used as well as a number of polymer based scale inhibitors. These can include methacrylic diphosphonate homopolymer, acrylic acid-allyl ethanolamine diphosphonate copolymer, SVS (sodium vinyl sulphate)-acrylic acid-allyl ammonia diphosphonate terpolymer, acrylic acid-maleic acid-DETA (diethylene triamine) allyl phosphonate terpolymer, polyaspartic acid, polycarboxylates.

In a preferred embodiment, a formulation contains 25-30 wt.-% water or solvent, 0.5-10 wt.-% copolymers of the invention for sulphide scale inhibition, 1-25 wt.-% of a conventional scale inhibitor and 5-50 wt.-% glycol based solvent.

In a further preferred embodiment, a formulation contains 25-30 wt.-% water or solvent, 0.5-10 wt. -% copolymers of the invention for sulphide scale inhibition, 0.5-5 wt.-% ethanolamine phosphoric acid conventional scale inhibitor, 0.5-20 wt.-% phosphonic, sulphonic and carboxylic acid conventional scale inhibitor and 5-50 wt.-% glycol based solvent.

Such formulations are suitable for low and high temperature applications.

An example of such a formulation is shown below;

Water 27.5 wt.-%, copolymers of the invention, 7.5 wt.-%, Ethanolamine phosphoric acid solution 1.5 wt.-%, Phosphonic, sulfonic or carboxylic acid polymer 13.5 wt.-%, diethylene glycol 50 wt.-%.

EXAMPLES

The following examples are based upon a brine composition as described in Table 1 at a pH of 7.0

TABLE 1

Brine composition for examples 1-6

| Ion | Sea Water [wt.-ppm] | Salt | Cations [g/l] | Anions [g/l] | Final (50:50) [g/l] |
|---|---|---|---|---|---|
| Na | 10890 | NaCl | 24.04 | 24.04 | 24.04 |
| Ca | 428 | $CaCl_2 \cdot 2H_2O$ | 3.15 | 0 | 1.57 |
| Mg | 1368 | $MgCl_2 \cdot 6H_2O$ | 22.89 | 0 | 11.45 |
| K | 460 | KCl | 1.75 | 0 | 0.88 |
| Zn | 20 | $Zn(CH_3COO)_2 \cdot 2H_2O$ | 0.13 | 0 | 0.07 |
| Pb | 20 | $Pb(CH_3COO)_2 \cdot 3H_2O$ | 0.07 | 0 | 0.04 |
| S | 250 | $Na_2S$ (anhydrous) | 0 | 1.22 | 0.61 |

It is of course possible to use e.g. $Na_2S.3H_2O$ or $Na_2S.9H_2O$ instead of anhydrous $Na_2S$.

The composition of the copolymers used as ZnS/PbS scale inhibitor/dispersant were as follows (percentages denote mol-%):

Polymer 1: 58% AMPS, 38% Acrylic Amide, 2% n-Vinyl Formamide, 2% Vinyl Phosphonic Acid. Number average molecular mass 4-5 Million g $mol^{-1}$.

Polymer 2: 78% AMPS, 38% Acrylic Amide, 2% n-Vinyl Formamide, 2% Vinyl Phosphonic Acid. Number average molecular mass 4-5 Million g $mol^{-1}$.

Polymer 3: 83% AMPS, 5% n-Vinyl Pyrrolidone, 5% n-Vinyl Formamide, 5% Acrylic Amide, 2% Vinyl Phosphonic Acid. Number average molecular mass 0.5-1 Million g $mol^{-1}$.

Separate cation and anion brines were prepared. The cation brine contained NaCl, $CaCl_2$, $MgCl_2$, KCl, $Zn(CH_3COO)_2$ and $Pb(CH_3COO)_2$. The anion brine contained only NaS.

The respective ZnS/PbS scale inhibitor/dispersant copolymer was then added to the anion brine. The cation brine was subsequently mixed with the anion brine at a 50:50 volume mix in a glass jar. The jars were placed into a 90° C. water bath and monitored over 24 hours. The visual appearance was noted and concentrations of Zn and Pb were determined using ICP. These are expressed as Pb or Zn Inhibition Efficiency relative to a blank and control sample of the brine. For this determination, a sample of the liquid which is above the precipitate, if any, is taken. The liquid is analyzed for Zn and Pb content using ICP. The higher the Zn and Pb concentration is, the higher the Efficiency is. The examples 1-12 below use different copolymers/terpolymers as indicated.

Visual appearance checks on the jars were made to see there was any Zinc Sulphide/Lead Sulphide/Iron Sulphide precipitation. If there was precipitation within the jars a dark solid would be present at the bottom of the jars. This would be seen in the comparative examples which would contain 50% cation brine and 50% anion brine without any ZnS/PbS scale inhibitor/dispersant copolymer. For jars where Zinc Sulphide/Lead Sulphide/iron Sulphide was being successfully inhibited and/or dispersed a solution of high turbidity that was extremely dark in colour (dark grey) is observed. As inhibitor and/or dispersant performance decreases a solution with decreased turbidity is observed, i.e. the solution becomes clearer and solids precipitate and settle at the bottom of the jar.

Inductively Coupled Plasma (ICP) was used as an analytical method used to measure the elemental composition of fluids. The analyte is introduced via a nebuliser to create a fine spray and in combination with Argon gas creates a plasma. The plasma then passes through a torch, where, depending upon which elements are present within the plasma, emit a characteristic wavelength. The characteristic wavelength is detected using a spectrometer (Optical Emission Spectrometer, OES) that is linked to the ICP instrument. The intensity of the wavelength emission is directly proportional to the concentration of the element that is being studied.

The results obtained were as follows. The ppm values refer to weight ppm of the respective polymer based on the total weight of the brine.

TABLE 2

Pb inhibition efficiency in Examples 1-3

| | | Pb Efficiency | | | |
|---|---|---|---|---|---|
| Example | Polymer | 10 ppm | 50 ppm | 100 ppm | 500 ppm |
| 1 | 1 | 90 | 116 | 129 | 97 |
| 2 | 2 | 90 | 115 | 108 | 90 |
| 3 | 3 | 87 | 108 | 109 | 74 |

TABLE 3

Zn inhibition efficiency in Examples 4-6

| | | Zn Efficiency | | | |
|---|---|---|---|---|---|
| Example | Polymer | 10 ppm | 50 ppm | 100 ppm | 500 ppm |
| 4 | 1 | 109 | 118 | 114 | 95 |
| 5 | 2 | 107 | 113 | 107 | 86 |
| 6 | 3 | 115 | 128 | 108 | 73 |

The efficiencies were calculated according to $$\text{Efficiency} = (C_t - C_{Blank})/(C_{control} - C_{Blank}) \times 100$$

where:
- $C_t$ is equal to the concentration of the ion at a given time (i.e. after 24 hours)
- $C_{Blank}$ is equal to the lowest possible concentration of the ion at a given time (i.e. 24 hours with full amount of scaling)
- $C_{control}$ is equal to the highest possible concentration of the ion at a given time (i.e. 24 hours with no scaling)

The control values were obtained through analyzing a sample made up of 50% cations and 50% anions by ICP straight away, i.e. without time delay. This of course leads to some scale formation and thus a loss of Zinc and Lead concentration.

In ICP-OES (inductively coupled plasma optical emission spectrometry) high viscosity and low surface tension fluids can impair sample nebulization and transport of the analytes to the detector, causing inaccuracies especially in samples with high dissolved solids.

In the examples using 100 or 500 ppm of the polymer, the samples may not have nebulized fully as a result of the higher viscosity from the relatively higher inhibitor concentrations present. This can lead to a reduction in the Zinc and Lead concentrations that are detected by ICP-OES and accounts for the decline in efficiency at higher polymer concentrations.

Further to this due to the standardization technique employed in the examples was 'matrix matching', the concentrations of Zinc and Lead are not corrected from the loss of sample during the nebulization of the sample. If an internal standard was employed the instrument can correct the concentrations of Zinc and Lead. The 'matrix matching' correction would account for the salinity interferences of the brine such as spectral interferences and reduced ionisation of the analytes in the plasma, however variation in the nebulisation of the samples would not have been accounted for.

Examples 7-12 again used copolymers 1-3 as listed above at the same concentrations, as well as the same test conditions, however they use harsher water chemistry, as shown below;

TABLE 4

Brine composition for Examples 7-12

| Ion | Sea Water [wt.-ppm] | Salt | Cations [g/l] | Anions [g/l] | Final (50:50) [g/l] |
|---|---|---|---|---|---|
| Na | 10890 | NaCl | 24.04 | 24.04 | 24.04 |
| Ca | 428 | $CaCl_2 \cdot 2H_2O$ | 3.15 | 0 | 1.57 |
| Mg | 1368 | $MgCl_2 \cdot 6H_2O$ | 22.89 | 0 | 11.45 |
| K | 460 | KCl | 1.75 | 0 | 0.88 |
| Ba | 0 | $BaCl_2 \cdot 2H_2O$ | 0 | 0 | 0 |
| Sr | 0 | $SrCl_2 \cdot 6H_2O$ | 0 | 0 | 0 |
| Zn | 400 | $Zn(CH_3COO)_2 \cdot 2H_2O$ | 2.69 | 0 | 1.34 |
| Pb | 400 | $Pb(CH_3COO)_2 \cdot 3H_2O$ | 1.46 | 0 | 0.73 |
| $SO_4$ | 0 | $Na_2SO_4$ | 0 | 0 | 0 |
| S | 250 | $Na_2S$ (anhydrous) | 0 | 1.22 | 0.61 |

TABLE 5

Pb inhibition efficiency in Examples 7-9

| | | % Pb Efficiency | | | |
|---|---|---|---|---|---|
| Example | Polymer | 10 ppm | 50 ppm | 100 ppm | 500 ppm |
| 7 | 1 | 0.05 | 3.42 | 24.65 | 97.05 |
| 8 | 2 | 27.55 | 64.42 | 87.39 | 93.17 |
| 9 | 3 | −0.09 | 0.64 | 72.25 | 81.45 |

TABLE 6

Zn inhibition efficiency in Examples 10-12

| | | % Zn Efficiency | | | |
|---|---|---|---|---|---|
| Example | Polymer | 10 ppm | 50 ppm | 100 ppm | 500 ppm |
| 10 | 1 | 0.32 | 2.84 | 18.96 | 76.40 |
| 11 | 2 | 7.37 | 44.13 | 72.31 | 72.37 |
| 12 | 3 | 0.16 | 93.28 | 82.41 | 63.82 |

The invention claimed is:

1. A process for the inhibition and/or dispersion of inorganic sulphide scales, wherein the process comprises the step of adding a copolymer comprising
   a) 0.1 to 10 mol-% of structural units derived from vinylphosphonic acid or of a salt thereof,
   b) 40 to 80 mol-% of structural units derived from compounds of the formula (1)

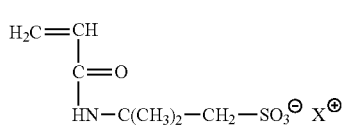

(1)

c) 1 to 50 mol-% of structural units derived from compounds of the formula (5)

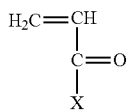

(5)

in which $X^+$ is $NR^3R^4$, X is OH or $NR^3R^4$, and $R^3$ and $R^4$, independently of one another, are H or $C_1$-$C_4$-alkyl to water within an oil or gas containing formation, wherein the copolymer inhibits and/or disperses inorganic sulphide scales in the formation, wherein the number average molecular weight of the copolymer is from 100,000 to 10,000,000 g/mol, determined by GPC against polyacrylic acid as standard.

2. The process according to claim 1, wherein the copolymer further comprises 1 to 10 mol-%, based on the weight of the copolymer, of structural units of formula (2)

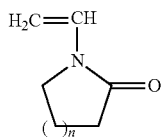

(2)

in which n is 3, 4 or 5.

3. The process according to claim 1, wherein the copolymer further comprises 1 to 10 mol-% of structural units of formula (3)

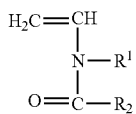

(3)

in which $R^1$ and $R^2$, independently of one another, are hydrogen or $C_1$-$C_4$-alkyl.

4. The process according to claim 1, wherein the copolymer comprises less than 1 mol-% monomers which comprise an olefinically unsaturated hydrocarbon substituted ammonium salt group, wherein the expression hydrocarbon encompasses groups containing oxygen.

5. The process according to claim 1, wherein in the copolymer the proportion by weight of vinylphosphonic acid or salts thereof is from 0.8 to 6 mol-%.

6. The process according to claim 1, wherein in the copolymer the proportion of structural units which are derived from compounds of the formula (1) is from 45 to 70 mol-%.

7. The process according to claim 1, wherein in the copolymer the proportion of structural units which are derived from compounds of the formula (5) is from 5 to 45 mol-%.

8. The process according to claim 1, wherein formula (5) is acrylic acid and/or acrylamide.

9. The process according to claim 1, wherein formula (5) is acrylamide and the proportion thereof is from 5 to 45 mol-%.

10. The process according to claim 1, wherein formula (5) is a mixture of acrylic acid and acrylamide, and the proportion of acrylic acid is from 1 to 10 mol-%, and the proportion of acrylamide is from 1 to 40 mol-%.

11. The process according to claim 3, wherein the proportion of structural units which are derived from the compound of the formula (3) is from 1 to 10 mol-%.

12. The process according to claim 2, wherein the proportion of structural units which are derived from the compound of the formula (2) is from 1 to 10 mol-%.

13. The process according to claim 1, further comprising the step of adding a conventional scale inhibitor to the water within an oil or gas containing formation.

14. The process according to claim 1, further comprising the step of adding a composition comprising 0.5-10 wt.-% the copolymer, 25-30 wt.-% water or solvent, 1-25 wt.-% of a conventional scale inhibitor and 5-50 wt.-% of a glycol based solvent, to the water within an oil or gas containing formation.

15. The process according to claim 13, wherein the conventional scale inhibitor is selected from the group consisting of diethylenetriamine penta(methylene phosphonic acid), nitrilo(methylene phosphonic acid), methacrylic diphosphonate homopolymer, acrylic acid-allyl ethanolamine diphosphonate copolymer, SVS (sodium vinyl sulphate)-acrylic acid-allyl ammonia diphosphonate terpolymer, acrylic acid-maleic acid-DETA (diethylene triamine) allyl phosphonate terpolymer, polyaspartic acid, and polycarboxylates.

* * * * *